United States Patent [19]
Tavallaei

[11] Patent Number: 6,038,633
[45] Date of Patent: Mar. 14, 2000

[54] SYSTEM AND METHOD FOR PROVIDING A DUAL INTERRUPT MECHANISM TO DESIGNATE THE OCCURRENCE AND TERMINATION OF AN EVENT

[75] Inventor: Siamak Tavallaei, Spring, Tex.

[73] Assignee: Compaq Computer Corporation, Houston, Tex.

[21] Appl. No.: 08/912,096

[22] Filed: Aug. 15, 1997

[51] Int. Cl.[7] .................................................. G06F 13/14
[52] U.S. Cl. .......................... 710/262; 710/267; 710/268; 714/7; 714/11
[58] Field of Search .................................. 395/733–742; 710/102–103; 714/6, 15, 7, 24, 8, 11, 40, 42, 44, 56

[56] References Cited

U.S. PATENT DOCUMENTS

| | | | |
|---|---|---|---|
| 5,313,640 | 5/1994 | Beardsley et al. | 395/733 |
| 5,526,289 | 6/1996 | Dinh et al. | 364/557 |
| 5,542,076 | 7/1996 | Benson et al. | 395/733 |
| 5,574,667 | 11/1996 | Dinh et al. | 364/557 |
| 5,613,129 | 3/1997 | Walsh | 395/740 |
| 5,631,800 | 5/1997 | Jin et al. | 361/103 |
| 5,634,038 | 5/1997 | Saitoh | 395/490 |
| 5,638,895 | 6/1997 | Dodson | 165/121 |
| 5,701,494 | 12/1997 | Satoh | 395/735 |
| 5,708,814 | 1/1998 | Short et al. | 710/260 |
| 5,768,599 | 6/1998 | Yokomizo | 395/733 |
| 5,822,547 | 10/1998 | Boesch et al. | 710/103 |

OTHER PUBLICATIONS

The I[2]C–Bus and how to use it (including specification); Philips Semiconductor; Apr. 1995; pp. 1/24.

"Remote 8–bit I/O expander for I[2]C–Bus" Data Sheet; Philips Semiconductor; Apr. 2, 1997; pp. 1–23.

Farnsworth, C.; "Low Power Implementation of an I[2]C–Bus Expander"; http://maveric0.uwaterloo.ca/amulet/publications/thesis farnsworth94_msc.html; Jun. 16, 1997; one page.

Collins, Andy; "Interfacing TMS370 Microcontrollers to I[2]C–BusIC"; Logikos; wysiwyg://111/http://www.logikos.com/tms370.html: Jun. 16, 1997; pp. 1–6.

"I[2]C–Bus Expander" Application Note AN036; Philips Semiconductors Programmable Logic Devices; Oct., 1993; 22 pages.

"The PCI (Peripheral Component Interconnect) Bus"; Aug. 6, 1997; pci.txt at www.gl.umbc.edu; pp. 1–7.

"Re: What's the difference between locks and semaphores?"; Jim Barton (jmb@patton.wpd.sgi.com) Jan. 2, 1991; Accessed Jun. 16, 1997; http://www.sgi.com/Archive/comp.sys.sgi/1991/Jan/0006.html.

"Internal Data Structures, 6.4.3 Semaphores" Basic Concepts; Accessed Jul. 11, 1997; http://linux.www.db.erau.edu/LPG/node47.html.

(List continued on next page.)

Primary Examiner—Ayaz R. Sheikh
Assistant Examiner—Raymond N. Phan
Attorney, Agent, or Firm—Jenkens & Gilchrist, P.C.

[57] ABSTRACT

A system and an associated method which provides a dual interrupt mechanism to designate the occurrence and termination of an event. In a computer system employing redundant components, upon removal of a defective redundant unit within the computer system, a first interrupt is generated to signal the absence of the unit. Polling or other system monitoring of the status of the absent unit is masked or disabled, thereby eliminating unnecessary polling for the missing unit. Upon replacement of the unit, a second interrupt alerts the computer system of the event termination and cancels the polling mask.

15 Claims, 5 Drawing Sheets

OTHER PUBLICATIONS

"The PCI Local Bus"; Accessed Jul. 27, 1997; http://www.rns.com/whats new/wh pci.html.

"PCI Bus Technology" Information Brief; *IBM Personal Computing Solutions;* Accessed Jul. 27, 1997; http://www.us. pc.ibm.com/infobrf/ibpci. html.

"PCI164 Screamer Functional Diagram" Microway; Accessed Jul. 27, 1997; http://www.microway.com/block.html.

"The PCI (Peripheral Component Interconnect) Local Bus" description of PCI Bus: Accessed Jul. 27, 1997; http;//www.sundance. com/pci.html.

"CMOS Bus Switches Provide Zero Delay Bus Communication" Application Note AN–09; Quality Semiconductor Inc.; date unknown; pp. 1–9.

"High–Performance CMOS Analog 8–Channel Switch" QS4A05Q Preliminary; Quality Semiconductor Inc.; May 30, 1996; pp. 1–7.

"Quickswitch® Converts TTL Logic to Hot Plug Operation" Application Note AN–13; Quality Semiconductor Inc.; date unknown; pp. 1–5.

SYSTEM AND METHOD FOR PROVIDING A DUAL INTERRUPT MECHANISM TO DESIGNATE THE OCCURRENCE AND TERMINATION OF AN EVENT

BACKGROUND OF THE INVENTION

1. Field of the Invention

The present invention relates generally to a computer system that provides a dual interrupt mechanism to designate the occurrence and termination of an event. More particularly, the present invention is directed to a system and method for facilitating alerting the computer system to event termination, such as when a hot-pluggable component is replaced within the computer system. Even more particularly, the present invention is directed to a dual interrupt control by which the computer system need not monitor or poll the status of a removed component.

2. Description of Related Art

Networks serve the purpose of connecting many different personal computers, workstations, or terminals to each other, and to a host computer, printers, file servers, etc., so that expensive computing assets, programs, files and other data may be shared among many users.

In a network utilizing a client/server architecture, the client (personal computer or workstation) is the requesting machine and the server is the supplying machine, both of which are connected via the network, such as a local area network (LAN) or wide area network (WAN). This is in contrast to early network systems that utilized a mainframe with dedicated terminals.

In a client/server network, the client contains the user interface and may perform some or all of the application processing and, as mentioned above, can include a personal computer or workstation. The server in a client/server network can be a high-speed microcomputer or minicomputer and, in the case of a high-end server, can include multiple processors and mass data storage, such as multiple hard drives and multiple CD-ROM drives. A database server maintains the databases and processes requests from the client to extract data from or update the database. An application server provides additional business processing for the clients. The network operating system (NOS) together with the database management system (DBMS) and transaction monitor (TP monitor) are responsible for the integrity and security of the server, as is understood in this art.

Client/server networks are widely used throughout many different industries and business organizations. The mass storage and multi-processing capabilities provided by current client/server network systems (i.e., high-end servers) permit a wide range of essential services and functions to be provided through its use.

As can be appreciated, many of these businesses are highly dependent upon the availability of their client/server network systems to permit these essential network services and functions to be carried out. As these client/server network systems become increasingly essential to the everyday operations of these businesses, additional steps need to been taken in the design and construction of the server in the client/server network system to ensure its continuous availability to the clients. That is to say, in the design and construction of a server, steps need to be taken to ensure that the server can be operated with little or no down time.

It should be understood, therefore, that server reliability and serviceability are two valuable design aspects in ensuring that a server will operate with little or no down time. The modularity of components within a server has been recognized as an important design consideration in ensuring that the down time of a server will be minimized. Modules can be removed and examined for operability or other purposes much easier than permanently mounted fixtures within a server chassis. When various components of a server can be easily removed in a modular manner, they can also be readily replaced to maintain the operational status of the server.

Removable modular components today include disc drives and power supplies. As referenced above, the removability of modular components allows for better overall serviceability of the computer system which is a distinct advantage. For example, a defective power supply in the server or any computer system, such as the PC or workstation, generally requires prompt replacement in order to limit downtime. Modular components and connectors facilitate prompt replacement and are thus popular in many computer designs.

Originally, a rule of practice in the maintenance of modular components or printed circuit boards of a server was that of always turning the power to the server off before any modular components or printed circuit boards were removed or added from the chassis or support frame of the server. Recent innovations have addressed the desirability to insert and remove modular components and printed cards from the chassis of the server (or any computer system) when the server is electrically connected and operational, i.e., "hot-pluggable."

Hot-pluggable components today include storage or disc drives, drive cages, fans, power supplies, system I/O boards, control boards, processor boards, and other subassemblies. The "hot" removability of these server components allows for better overall serviceability of the computer system, which is a distinct advantage to both the user and the maintenance technician.

Component redundancy has also been recognized as an important design consideration in ensuring that a server will operate with little or no down time. Essentially, component redundancy is sometimes provided to better ensure that at least one of the redundant components remains operable. Accordingly, with component redundancy, at least two components are both provided that can perform the same function, such that if one of the components becomes faulty for some reason, operation transfers over to the redundant component. When at least one of the redundant components is operable, continued operation of the computer system is possible even if others of the redundant components fail. Therefore, to further enhance reliability and serviceability, redundant components have been made hot-pluggable.

Reconfiguration of the server system can also be accomplished with upgradable modular components. This can be accomplished by the addition or substitution of components having different circuits, e.g., updated or upgraded, disposed thereupon. When components are redundant and hot-pluggable, reconfiguration of the server is often possible without taking the server offline.

Another important design aspect with redundant and hot-pluggable components is to ensure and maintain a safe working environment while the server is operating and being repaired or upgraded. Therefore the exposure of hot connectors and contacts must be kept to a minimum.

Steps are similarly also taken in the design and construction of the server system to ensure that the server system is readily serviceable, such that when the client/server network system must be serviced the down time can thereby be minimized. In existing client/server network systems it is often difficult to obtain important data corresponding to a component failure in order to facilitate the quick serviceability of the server. Therefore, the more information that can be readily provided to locate a defective component or problem with the server, the amount of time the server is down can be minimized.

A computer server is an exemplary computer system, and is typically utilized when a group of discretely-positioned computer systems are connected together in a networked fashion. The computer server, and files contained therein, is selectively accessible by any of the computers in the networked connection with the computer server. When access to the files stored at the computer server is essential to perform a particular service or function, it is imperative that the computer servers be online and available so that the files stored therein can be accessed.

A user interface for a computer system provides selected information relating to the computer system in human perceptible form to a user of the computer system. A user interface sometimes also permits a user of the computer system to input commands to the computer system. A computer keyboard and a video display terminal are exemplary of the user interfaces conventionally used in conjunction with a computer system.

When one of a pair (or multiple) of redundant devices fails, e.g., a primary or backup power unit or fan, the defective device must be replaced. Since a replacement may not be readily available due to shortage and/or demand, the server or other computer system may be required to operate without the unit for some time, perhaps weeks or more, before the replacement arrives and is installed. Conventional computer systems, such as servers, are interrupt-driven. Interrupts have been used since the introduction of the mainframe computers of the 1950's to alert the computer system, e.g., the system's processor, of special conditions occurring therein, which generally relate to Input/Output (I/O). Computer systems, however, employ a wide variety of interrupts to handle a corresponding variety of particular conditions requiring the attention of the processor. The action taken by the processor responsive to the interrupt is referred to as "serving" the interrupt.

Within servers and other computer systems employing redundant devices, the action of removing a given, hot-pluggable component triggers an interrupt mechanism to alert the system of this change in operational status. The system, in turn, initiates a polling or monitoring routine to periodically check on the status of the absent unit, i.e., to detect a consequent change back to an operational mode. It should be understood that this polling routine is itself an interrupt-driven mechanism. Depending on the periodicity of the polling schedule, the system eventually detects the replacement of the defective device. Polling is then canceled. In implementation, it should be understood that conventional computer systems may periodically poll a flag value, e.g., a power_unit_present flag for a given power unit, associated with the particular action or event to determine the status of the missing (flag set) or present (flag zeroed) device in question.

Since the aforedescribed periodic polling by the computer system consumes system resources, particularly processor time, it is an object of the present invention to conserve system resources and improve system performance by eliminating unnecessary polling.

It is a further object of the present invention to provide a system and method for ascertaining the termination of an interrupt-driven event upon the conclusion of that event instead of waiting for the polling routine to detect the change in event status.

It is in the light of this background information related to computer systems, redundant devices and the generation of interrupt messages that significant improvements of the present invention have evolved.

SUMMARY OF THE INVENTION

The present invention is directed to a system and an associated method providing a dual interrupt mechanism to designate the occurrence and termination of an event. In a computer system employing redundant components, upon removal of a defective redundant unit within the computer system, a first interrupt is generated to signal the absence of the unit. Polling or other system monitoring of the status of the absent unit is masked or disabled, thereby eliminating unnecessary polling for the missing unit. Upon replacement of the unit, a second interrupt alerts the computer system of the event termination and cancels the polling mask.

BRIEF DESCRIPTION OF THE DRAWINGS

A more complete understanding of the system and method of the present invention may be had by reference to the following Detailed Description when taken in conjunction with the accompanying Drawings wherein.

DETAILED DESCRIPTION OF PRESENTLY PREFERRED EXEMPLARY EMBODIMENTS

The present invention will now be described more fully hereinafter with reference to the accompanying drawings, in which preferred embodiments of the invention are shown. The present invention may, however, be embodied in many different forms and should not be construed as limited to the embodiments set forth herein; rather, these embodiments are provided so that this disclosure will be thorough and complete, and will fully convey the scope of the invention to those skilled in the art.

The scientific and business world has become more and more dependant on the support of computer systems. Computer systems are being used to control the environments of buildings, control the workings of assembly lines, banking transactions, document production, manufacturing research and development, managerial operations, information systems, and a growing multitude of other applications. When a computer system fails in today's business environment, the results can be temporarily catastrophic for the business. In that event, computer users may be unable to perform the wide variety of tasks that increasingly require the support of a computer system.

As discussed, in an effort to make a computer system more reliable, the designers of computer systems have placed redundant devices and subsystems in computer systems. The computer systems, therefore, have primary devices and sub-systems that are normally operational, and redundant devices that would be switched on, for example, when and if the primary devices failed. The redundant devices in such example normally stay dormant or off until the primary devices are not operational.

In the exemplary embodiments of the present invention there exists a primary device and a redundant device. Both primary and redundant devices are monitored and controlled by a microcontroller circuit. The microcontroller circuit, allows the primary device to be operational. The primary device is constantly monitored by the microcontroller to make sure that it is functioning properly.

The microcontoller is in electrical communication with a microprocessor that is responsive to the operating system of the computer system. Status information which includes the "health" and presence of the primary and redundant devices within the computer system are relayed from the microcontroller to the operating system and, in turn, provided to the user of the computer system, e.g., the user is notified that a particular component is malfunctioning or down.

Figure 1:
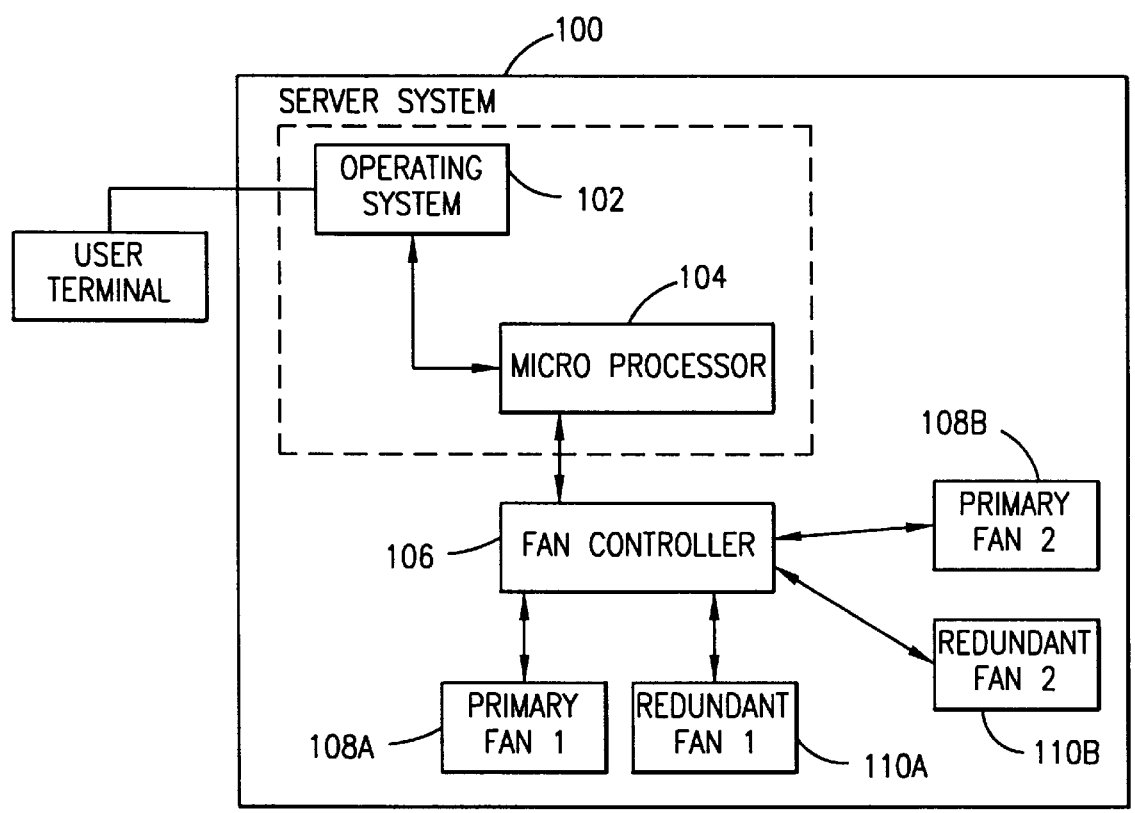
FIG. 1 depicts a block diagram of an exemplary computer system utilizing redundant fan units.

The preferred exemplary embodiment of the present computer system which includes a system and method for dual interrupt control is a computer server system. Referring to FIG. 1 there is illustrated an exemplary computer server 100 which may be used in practicing the method and apparatus of the present invention. The operating system 102 and a microprocessor board 104 perform and handle a majority of the functions of the server system 100. The microprocessor board 104 may have a plurality of microcontrollers on board and may further include a plurality of microcontroller boards connected to each other via a backplane or specialized communication busses.

One of the microcontroller boards, the fan controller 106, is preferably programmable to monitor multiple sets of primary devices 108 and redundant devices 110. Here the fan controller 106 monitors two sets of primary and redundant fans 108, 110. One of the sets is a primary fan 108A and a redundant fan 108A, the other set being primary fan 108B and redundant fan 108B.

As is understood in the art, when one of the primary fans, e.g., fan 108A, or one of the redundant, backup fans, e.g., fan 110A, indicates a malfunction or becomes defective, it must be replaced in order for the system 100 to adequately handle adverse thermal conditions. Upon removal of the defective fan, e.g., fan 108A, a fan_presence flag associated with the physical presence or connection of the fan 108A to the system, which is normally low (zero) to indicate proper placement and presence of the fan 108A, is set high (one) to indicate the occurrence of an event, i.e., the disconnection and removal of the fan 108A from the system 100. The change in flag value triggers a first interrupt which is forwarded to the operating system 102, particularly, an interrupt handler therein, for servicing, as described.

Since the supply of replacement fans may be limited, the disconnection status, i.e., a high fan_presence flag value, may endure for some time. In conventional systems, the status of the fan 108A would be continuously monitored until the missing unit was replaced. Thus, a series of discrete polling interrupts from the operating system 102 to the aforementioned fan-presence flag associated with fan 108A would ensue. By means of the series of polling interrupts, the system 100 remains informed as to the status of that unit.

As described hereinbefore, however, such periodic polling consumes system resources. Further, unless the status check comes just after the unit is replaced, the system 100 may be unaware of the presence of the replacement for some time, which is dependent upon the length of periodicity.

Figure 2:
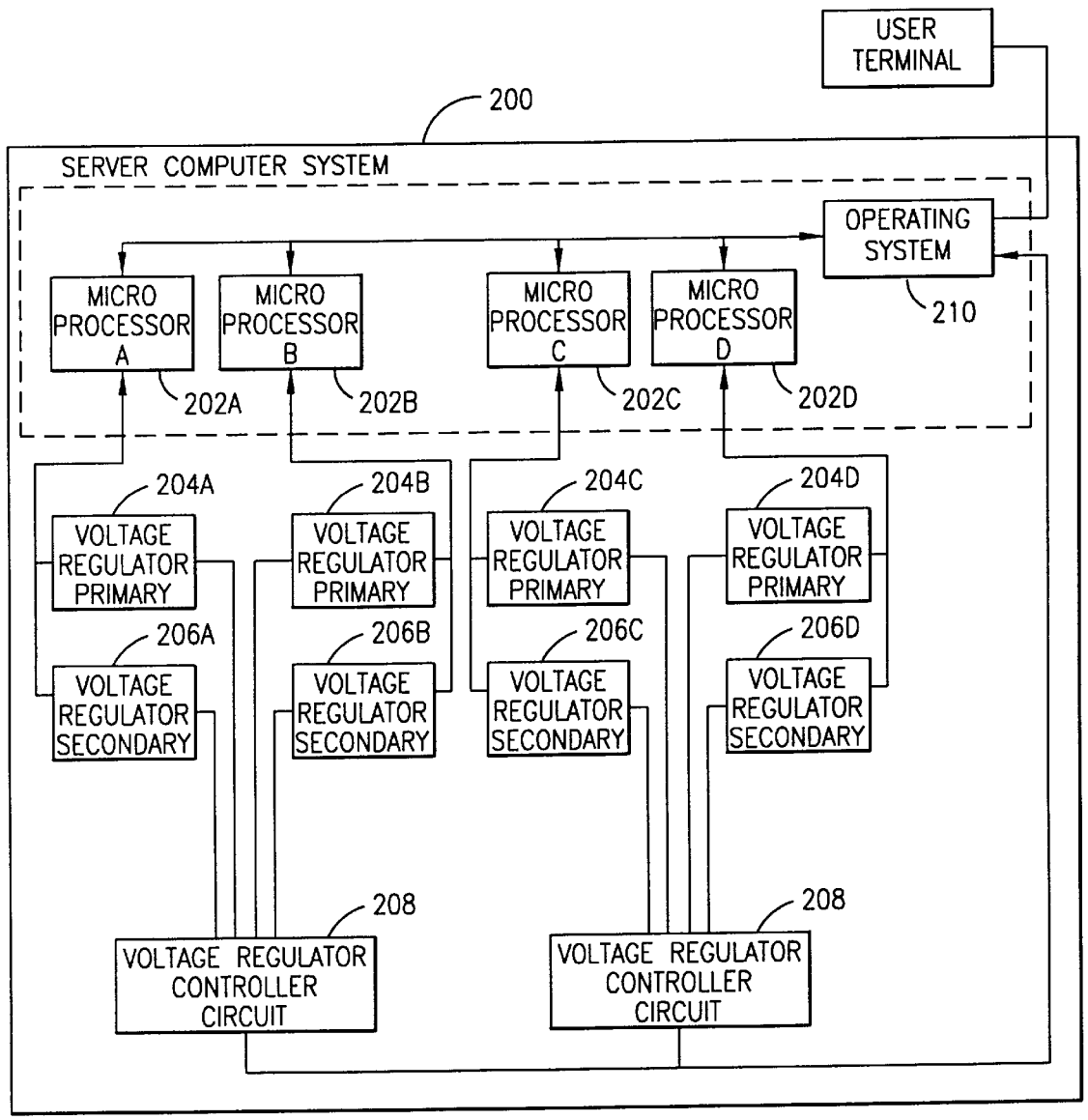
FIG. 2 depicts a block diagram of a second exemplary computer system utilizing redundant power units.

Shown in FIG. 2 is a second exemplary embodiment of a computer system 200 having a plurality of microprocessors 202A–D therein. Each microprocessor 202 requires its own voltage regulator to regulate, for example, 12 volt and 5 volt supply voltages. The importance of providing the proper regulated power to each microprocessor 202 is readily understood. Thus, each processor has associated therewith a primary voltage regulator module 204 and a secondary or redundant voltage regulator module 206.

A voltage regulator controller circuit 208 is connected to the primary 204 and redundant 206 voltage regulator modules. Under normal conditions a voltage regulator controller 208 instructs the primary voltage regulation circuit 204 to provide regulated power to the respective microprocessor 202. The controller 208 monitors the output of respective primary voltage regulators 204 (and operating redundant modules 206) to make sure that the voltage provided to the appropriate microprocessor 202 is within a predetermined voltage window.

The voltage regulator controller circuit 208 preferably contains therein a microcontroller which can be polled or can provide interrupt signals to other circuits related to the main microprocessors 202. An operating system 210, via the microprocessors 202 and related circuitry (not shown) can communicate with the voltage regulator controller circuits 204 and potentially set the voltage window or current window to be provided by the primary or secondary voltage regulators 204, 206.

As discussed in connection with the exemplary embodiment with the fans (FIG. 1), when one of the voltage regulator modules, e.g., module 204A, associated with a particular microprocessor, e.g., 202A, fails, the defective unit must be replaced. Upon removal of the defective voltage regulator module 204A, a regulator_presence flag, normally low (zero) to indicate proper placement and presence of the module 204A, is set high (one) to indicate the occurrence of the disconnection and removal of the module 204A from the system 200. This change in flag value, as with the fan embodiment, triggers the first interrupt sent to the operating system 210, which, in turn, triggers the periodic polling for the missing component.

Figure 3:
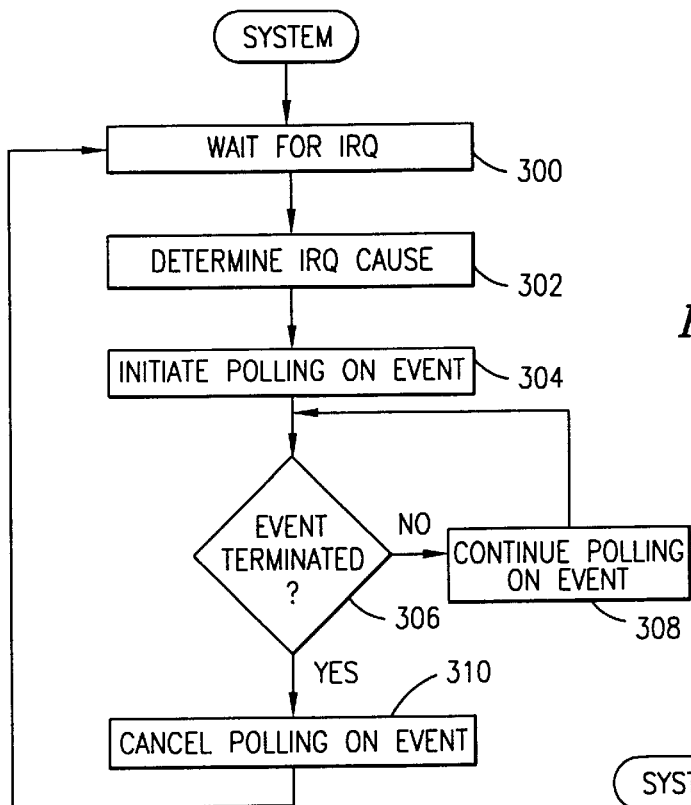
FIG. 3 provides a flow chart of a conventional method for handling interrupt-driven events.

With a conventional interrupt handling mechanism, shown as a flowchart in FIG. 3, such as used in system 100 in servicing the sub-systems shown in FIGS. 1 and 2, the system interrupt handler awaits (box 300) the occurrence of an interrupt, e.g., caused by the disconnection of the fan 108A or the voltage regulator module 204A from the system 100. The handler then ascertains the cause of the interrupt (box 302) and initiates the aforedescribed polling routine (box 304) to periodically check whether the event in question, e.g., the absence of the fan 108A or module 204A, has terminated (box 306). If not, then further polling interrupts for that event (box 308) are performed, separated from each other by a discrete amount of time, until the event terminates, e.g., the replacement fan 108A or module 204A is installed. The polling routine for that event is then canceled (box 310) and the interrupt handler resumes its wait (box 300).

As noted, in conventional computer systems there is no positive affirmation of the termination or closure of a given event. Instead, the system learns of the status change through periodic polling, which although satisfactory for short-term interrupts, e.g., pertaining to I/O, is unsatisfactory for long-term interrupts of hours, days or weeks. What is needed, therefore, is an event closure interrupt affirmatively indicating the termination of the particular event in question. The present invention, therefore, is directed to a system and method incorporating discrete dual interrupts to mark event beginnings and endings, respectively. The first interrupt operates in the conventional sense to herald the arrival of a system event condition. The second interrupt operates as a closure or resolution signal. Consequently, no polling or monitoring in the conventional sense is needed to ascertain whether the event has been resolved.

Figure 4:
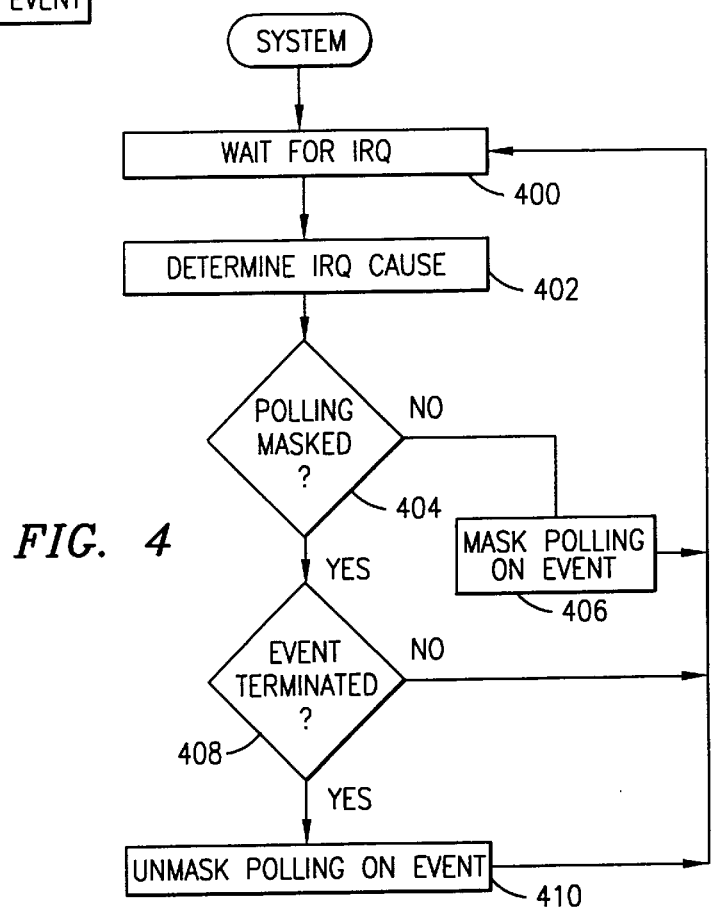
FIG. 4 provides a flow chart of an exemplary method for handling interrupt-driven events in accordance with the present invention.

Shown in FIG. 4 is a flowchart, illustrating some of the steps followed in practicing the method of the present invention. As in FIG. 3, the system 100 interrupt handler awaits (box 400) the occurrence of an interrupt, such as caused by the aforedescribed disconnected fan 108A or module 204A. The handler then ascertains the interrupt cause (box 402) and performs a check whether polling has been masked for that type of event generating the interrupt (box 404). If not, i.e., the interrupt has just occurred, then polling for that event, which is suitable for dual interrupt handling, is masked (box 406) until event termination, i.e., until the second, closing interrupt for that event occurs. Thus, control is transferred back to box 400 to await the second (or other) interrupt.

If the polling is already masked (box 404), then there occurs a check to ascertain whether the event in question has terminated (box 408), e.g., the fan 108A or module 204A has been reinstalled, triggering a change in the respective presence flags for each device to indicate such presence. If the indicated event has not terminated, then control is transferred to box 400 to await the second (or other) interrupt. If event termination is indicated, i.e., the second, ending interrupt has been received, then the polling protocol for that event masked in box 406 is now unmasked (box 410), and control transferred back to box 400, as described.

Figure 5:
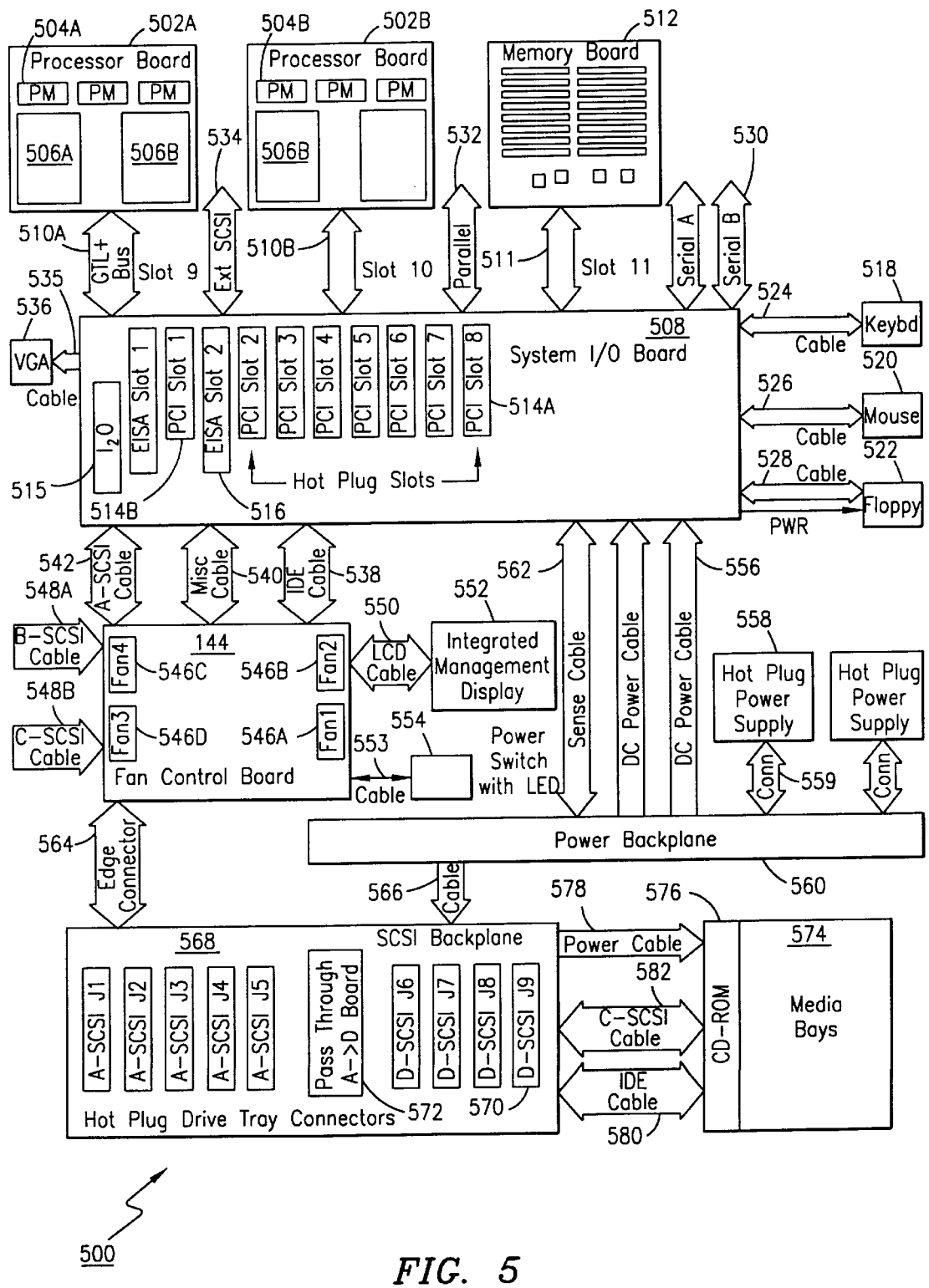
FIG. 5 is a block diagram of another exemplary computer system using the system and method of the present invention.

Referring now to FIG. 5, there is shown a board-level block diagram of a presently preferred exemplary computer system 500 in which the teachings of the present invention may be beneficially employed. It should be understood by those skilled in the art that while the exemplary computer system 500 is preferably organized as a zero downtime, highly available, high-end server system, the present invention may be practiced in virtually all types of computers.

The exemplary computer system 500 may include a number of processor boards, for example, processor boards 502A and 502B, each of which, in turn, may include at least one processor such as, for example, processors 506A and 506B, respectively. The processor boards 502A and 502B may also include, respectively, a plurality of power modules. For example, power modules 504A and 504B are shown therein.

Each of the processor boards 502A and 502B is connected to a system board 508 via a suitable bus connector or slot, for example, bus connector slots 510A and 510B, respectively. In the exemplary computer system 500, the presently preferred bus connector slots are compatible to be operable with the Gunning Transistor Logic (GTL) bus protocol. Furthermore, as will be seen hereinbelow, the system board 508 in the exemplary embodiment also contains a plurality of input/output (I/O) subsystems. Accordingly, the system board 508 may also be interchangeably referred to herein as the system I/O board.

With further reference to FIG. 5, a memory board 512 is also coupled to the system board 508 through a memory connection slot 511. In the exemplary computer system 500, the memory board 512 may include several dual in-line memory modules (DIMMs) having known sizes, for example, 8 MB, 16 MB, 32 MB, 64 MB, 128 MB, and 256 MB. As can be appreciated by those skilled in the art, the memory provided with the memory board 512 may be organized in any known fashion.

The exemplary system board 508 includes a plurality of expansion slots, suitable for different bus types. Further, these expansion slots may be selectively provided with "hot-pluggable" capability. One of ordinary skill in the art can readily appreciate that the ability to replace an expansion card (not shown), receivable at an expansion slot, without powering down the system 500 contributes to rendering the system 500 a "zero downtime" system with high availability. In the exemplary computer system 500, the plurality of expansion slots comprises those that may be operable with the Peripheral Component Interconnect (PCI) bus type (for example, slots 514A and 514B) as well as those slots that are compatible with the Extended Industry Standard Architecture (EISA) bus type (for example, slot 516). It should be appreciated that either categories of the expansion slots may be provided with hot-pluggability. The system board 508 may additionally comprise serial port connections, for example, serial connector 530, parallel port connection, for example, parallel connector 532, and a connector 534 compatible with the Small Computer System Interface (SCSI) bus type.

With still further reference to FIG. 5, the system board 508 is coupled to a host of input and output devices via cables, for example, a keyboard 518 with cable 524, a pointing device 520 with cable 526, a flexible disk drive 522 with 528, and a monitor 536 with cable 535. As illustrated, a separate power connection path 521 is also provided between the flexible disk drive 522 and the system board 508.

The exemplary system board 508 may also include an "intelligent I/O" bus connector 515 for accelerating the performance of selected PCI-compatible expansion slots. A fan control board 544 is coupled to the system board 508 through a SCSI cable 542, a miscellaneous cable 540 and an Integrated Drive Electronics (IDE) cable. The fan control board 544 contains a number of fan connectors, for example, fan connector 546A–546D, which fan connectors are used for coupling hot-pluggable fans. The fan control board 544 may be provided with additional SCSI-compatible cables, for example, cables 548A and 548B, a display cable 550 coupled to an integrated management display (IMD) unit 552, and a power switch cable 553 coupled to a power switch 554.

The miscellaneous cable connector 540, which joins the fan control board 544 with the system board 508, preferably contains signals generated by the IMD unit 552, various interlock signals provided by an interlock cabling system (not shown) interconnecting various boards, temperature signals, fan control signals, audio signals et cetera.

The system board 508 of the exemplary computer system 500 is coupled to a power backplane 560 via a sense cable 562 and at least one DC power cable 556. At least one hot-plug power supply unit 558 is connected to the power backplane 560 through a hot-plug power connector 559. Both the fan control board 544 and the power backplane 560 are coupled to a SCSI backplane 568 via an edge connector 564 and a power-SCSI backplane cable 566, respectively. The SCSI backplane comprises a plurality of SCSI drive tray connectors, for example tray connector 570. In the exemplary computer system 500, the SCSI drive tray connectors are also provided with the hot-plug capability in order to enhance the high availability aspect thereof. A media power cable 578 connects the SCSI backplane 568 to a media bay 574 and CD-ROM drive 576. A media SCSI cable 582 and an IDE cable 580 are also disposed between the SCSI backplane and the CD-ROM/media bay 576/574.

In another implementation of the present invention, directed to monitoring internal temperatures within the computer chassis, such as the components illustrated in FIG. 5, a pair of interrupts are used to monitor high temperature conditions without continuous polling. For example, an ambient_too_hot flag is used to indicate the occurrence of excess heat within the computer or server chassis. The flag, normally zeroed to indicate temperatures within operational limits, is set (one) when the ambient temperature exceeds those limits, e.g., a threshold value. A inverted counterpart to the ambient_too_hot flag, referred to herein as the inverted_too_hot flag, operates oppositely, i.e., when the flag is zeroed the temperature is too hot and when set the temperature is normal. A circuitry configuration for using the above flag pair is shown in FIG. 6.

In like manner, pairs of interrupt flags may be used in the particular examples set forth in FIGS. 1 and 2, illustrating redundant device usage. In particular, the fan_presence and regulator_presence flags may be paired with their respective inverted counterparts and utilized in conjunction with shift registers 600, as shown in FIG. 6.

Figure 6:
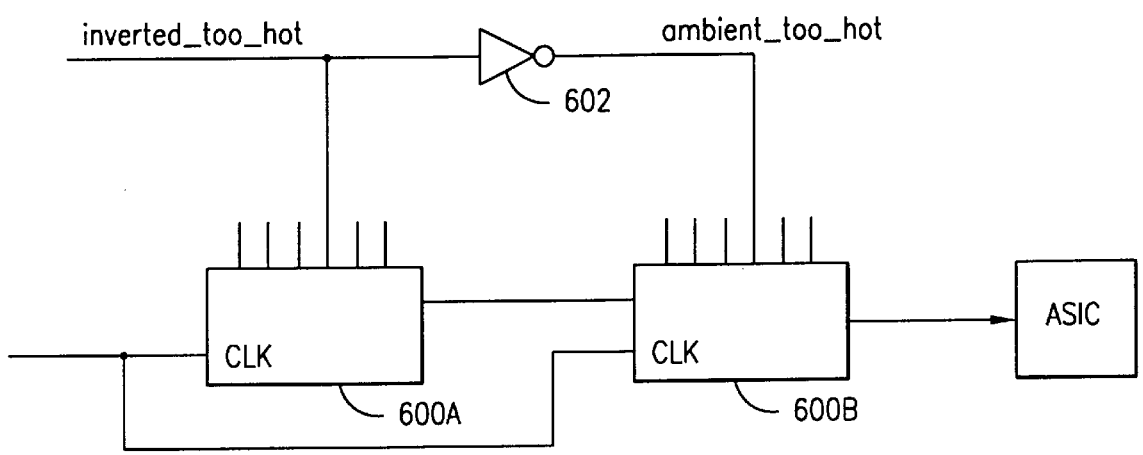
FIG. 6 is a block diagram of a portion of the computer system shown in FIG. 5.

With reference now to FIG. 6, a pair of shift registers 600A and 600B receive a number of inputs, including a clock (CLK) timing signal, as is understood in the art. One of the inputs, e.g., to shift register 600A, is the inverted_too_hot flag, as shown in FIG. 6. An inverter 602 inverts the inverted_too_hot flag to form the ambient_too_hot flag, when in turn feeds into shift register 600B. As is understood in the art, the values stored within the shift registers 600 are serially shifted bit by bit from shift register 600A to shift register 600B to an Application Specific Integrated Circuit (ASIC), such as within the computer system shown in FIG. 5, for further processing. Accordingly, when the inverted_too_hot flag is set (temperature is within limits), the ambient_too_hot flag is zeroed, also indicating tolerable temperatures.

To utilize the aforementioned temperature flags as dual interrupts, it should be understood that initially, i.e., when under normal temperatures, the ambient_too_hot flag, which may constitute a single bit, is interrupt enabled and the inverted_too_hot flag is disabled or masked by the computer system. When the chassis temperature passes operational limits, the enabled ambient_too_hot flag goes high and generates an interrupt, box 400 in FIG. 4. The first, beginning interrupt is, therefore, a low-to-high trigger. While the interrupt handler determines the cause of the interrupt (box 402), further system interrupts are temporarily disabled to avoid problematic and potentially conflicting sequencing flows. The first interrupt is then completed and the ambient_too_hot flag is disabled or masked and the inverted_too_hot is unmasked and enabled for interrupts (box 406). System interrupt capability is then restored and the system awaits a further interrupt (box 400).

As discussed, the inverted_too_hot flag remains at zero so long as the ambient chassis temperature (ambient_too_hot flag) is above the appropriate threshold. When the temperature drops, for example, due to the cooling actions of the fans 546, the ambient_too_hot flag goes low, indicating an acceptable temperature range, and the enabled inverted_too_hot flag, previously low, goes high, also acting as a rising-edge trigger. The operating system 102 in FIG. 1 then receives another, second interrupt (box 400 in FIG. 4). As before, further system interrupts are disabled and the interrupt handler examines the interrupt cause (box 402). Since polling for the temperature is obviated or masked (box 404) and the event is now terminating (box 408), the flags resume their initial values (box 410). In particular, the ambient_too_hot flag (now zero) is enabled for interrupts and the counterpart inverted_too_hot flag (now one) is disabled or masked. Interrupt capability for the system then resumes.

As discussed, the paired interrupt flags are in one of two states. The first, prior to receipt of the first interrupt, may be termed a normal state, i.e., temperature within normal limits, devices present and accounted for, etc. With the inverted flag disabled, the "normal" flag enables the system to receive the first interrupt. As discussed, the transition of the enabled normal flag from low to high triggers the first interrupt. Similarly, in the second state or mode after the first interrupt, the normal flag (first interrupt) is disabled and the inverted flag is enabled. The inverted flag in the second, "abnormal" state is low, being the counterpart of the now high normal flag. Consequently, upon the transition of the enabled inverted flag from low to high the second interrupt is triggered. Both transitions are, therefore, rising edge, and made possible by the simple expedient of the inverter 602 shown in FIG. 6.

In the aforedescribed manner, the dual interrupt configuration of the present invention eliminates the need for polling routines for the particular event in question. The system, therefore, operates without resource draining polling routines stealing cycle time from the processor. Through use of dual interrupts, the system handles interrupt-driven events promptly at their commencement and at their terminus.

By incorporating the exemplary embodiments of the present dual interrupt method and devices into, for example, a computer server system, the entire computer server achieves improved performance through conservation of system resources, primarily computer processing time, through elimination of unnecessary polling operations.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A computer system employing redundant components, upon removal of a defective redundant unit within said computer system, said computer system comprising:

an operating system;

an interrupt handler within said operating system, said handler handling a multiplicity of interrupts to said computer system caused by a multiplicity of events, a particular event of said multiplicity of events being associated with a disconnection of said defective redundant unit from at least a pair of redundant devices of said computer system, said particular event causing a first interrupt upon an occurrence of said particular event and a second interrupt upon a termination of said particular event, whereby a polling protocol associated with said particular event is masked during the time between said first and second interrupts;

interrupt enabling means, within said operating system, for selectively enabling said first and second interrupts, wherein said enabling means enables a reception of said first interrupt and disables said second interrupt prior to the occurrence of said particular events, disables said first interrupt and enables said second interrupt after said occurrence, enabling a reception of said second interrupt to terminate said particular event, and disables said second interrupt and enables said first interrupt after said termination; and wherein the second interrupt further terminates the polling mask.

2. The computer system according to claim 1, wherein a first interrupt flag, associated with said first interrupt, is enabled and a second interrupt flag, associated with said second interrupt, is disabled by said operating system prior to said occurrence, said operating system disabling said first interrupt flag and enabling said second interrupt flag after said occurrence.

3. The computer system according to claim 1, wherein said computer system is a server.

4. The computer system according to claim 2, wherein said first flag is an inverted value of said second flag.

5. The computer system according to claim 2, wherein said first and second interrupt flags are each Boolean values.

6. The computer system according to claim 5, wherein said first and said interrupt flags are each bit fields.

7. The computer system according to claim 1, wherein said redundant devices comprise a primary device and a plurality of secondary devices.

8. The computer system according to claim 1, wherein said redundant devices are selected from the group consisting of power modules, fans, Input/Output boards, microprocessors, microprocessor boards, disk controllers and bus controllers.

9. A method for determining a conclusion of an interrupt-driven event in a computer system, said computer system having an operating system and an interrupt handler therein for handling said interrupt-driven event, said method comprising the steps of:

detecting, within said operating system, the start of said interrupt-driven event with the interrupt-drive event being associated with a disconnection of a defective redundant device from at least a pair of redundant devices of the computer system, said event being initiated by a first interrupt to said computer system, said first interrupt being handled by said interrupt handler, said detecting including detecting a rising edge of a signal corresponding to a first interrupt flag;

detecting, within said operating system, a second interrupt to said computer system, said second interrupt being associated with said first interrupt and said event, said second interrupt being handled by said interrupt handler, whereby said operating system concludes said event, said detecting of the second interrupt including detecting a rising edge of a signal corresponding to a second interrupt flag having a value inverted from that of said first interrupt flag;

enabling, prior to detecting said first interrupt, the reception of said first interrupt;

disabling, prior to detecting said first interrupt, the reception of said second interrupt;

disabling, after the reception of said first interrupt, the reception of said first interrupt; and enabling, after the reception of said first interrupt, the reception of said second interrupt.

10. The method according to claim 9, wherein said first and second interrupt flags are each a Boolean value.

11. The method according to claim 9, wherein said first and second interrupt flags are each bit fields.

12. A computer system having an operating system therein and employing redundant components, upon removal of a defective redundant unit within said computer system, said computer system comprising:

an interrupt handler within said operating system, said handler handling a multiplicity of interrupts to said computer system caused by a multiplicity of events, a particular event being associated with a disconnection of said defective redundant unit from at least a pair of redundant devices of said computer system, said particular event causing a first interrupt upon an occurrence of said particular event and a second interrupt upon a termination of said particular event, whereby a polling protocol associated with said particular event is masked during the time between said first and second interrupts; and interrupt enabling means, within said operating system, for selectively enabling said first and second interrupts, wherein said enabling means enables the reception of said first interrupt and disables said second interrupt prior to the occurrence of said particular event, disables said first interrupt and enables said second interrupt after said occurrence, enabling a reception of said second interrupt to terminate said particular event, and disables said second interrupt and enables said first interrupt after said termination.

13. The computer system according to claim 12, wherein a first interrupt flag, associated with said first interrupt, is enabled and a second interrupt flag, associated with said second interrupt, is disabled by said operating system prior to said occurrence, said operating system disabling said first interrupt flag and enabling said second interrupt flag after said occurrence.

14. The computer system according to claim 13, wherein said first flag is an inverted value of said second flag.

15. A computer system having an operating system and employing redundant components, upon removal of a defective redundant unit within said computer system, said computer system comprising:

an interrupt handler within said operating system, said handler handling a multiplicity of interrupts to said computer system caused by a multiplicity of events, a particular event of said multiplicity of events being associated with a disconnection of said defective redundant unit from at least a pair of redundant devices of said computer system, said particular event causing a first interrupt upon an occurrence of said particular event and a second interrupt upon a termination of said particular event, an interrupt enabler within said operating system, said interrupt enabler configured to selectively enable said first and second interrupts, wherein said interrupt enabler enables the reception of said first interrupt and disables said second interrupt prior to the occurrence of said particular event, disables said first interrupt and enables said second interrupt after said occurrence, enables a reception of said second interrupt to terminate said particular event, and disables said second interrupt and enables said first interrupt after said termination.

* * * * *